United States Patent [19]

Andō

[11] Patent Number: 4,654,515
[45] Date of Patent: Mar. 31, 1987

[54] OPTICAL HEAD FOR FOCUSSING A LIGHT BEAM ON AN INFORMATION RECORDING MEDIUM

[75] Inventor: Hideo Andō, Tokyo, Japan

[73] Assignee: Kabushiki Kaisha Toshiba, Kawasaki, Japan

[21] Appl. No.: 612,781

[22] Filed: May 22, 1984

[30] Foreign Application Priority Data

May 28, 1983 [JP] Japan .................... 58-94610
Sep. 24, 1983 [JP] Japan ................... 58-176596
Sep. 29, 1983 [JP] Japan ................... 58-181269

[51] Int. Cl.[4] ................... G11B 7/00; G11B 21/10
[52] U.S. Cl. ................................... 250/201 DF
[58] Field of Search ............. 250/201 AF, 201 DF, 250/204; 369/44, 45, 46

[56] References Cited

U.S. PATENT DOCUMENTS 4,517,666  5/1985  Andō .................... 369/45
4,521,680  6/1985  Andō .................... 250/201 DF
4,546,460  10/1985  Andō .................... 369/45

Primary Examiner—David C. Nelms
Assistant Examiner—Stephone B. Allen
Attorney, Agent, or Firm—Cushman, Darby & Cushman

[57] ABSTRACT

In a system provided with an optical head, a laser beam produced from a laser unit 30 is converged by an objective lens 42 and reflected from a light reflecting layer 14 of an optical disk 2. The reflected laser beam is converged by a projection lens 62 and is projected to photosensitive regions of a photodetector 48. The photosensitive regions have an area smaller than a portion of a beam spot which is formed outside the regions when the objective lens 42 reaches a predetermined defocusing state. Photo signals generated from the photodetector 48 are added and processed by a focusing signal generator 68. A focus signal generated from the focusing signal generator 68 is supplied to a voice coil driver 72 so that the objective lens 42 is moved to a position which is in a just-focusing state by a voice coil 44 which is driven by the voice coil driver 72. When the objective lens 42 reaches the predetermined defocusing state and the level of the added photo signal falls within a predetermined level, a CPU 74 generates a off-signal to open a switching circuit 70 so that a connection between the focusing signal generator 68 and the voice coil driver 72 is disconnected.

30 Claims, 25 Drawing Figures

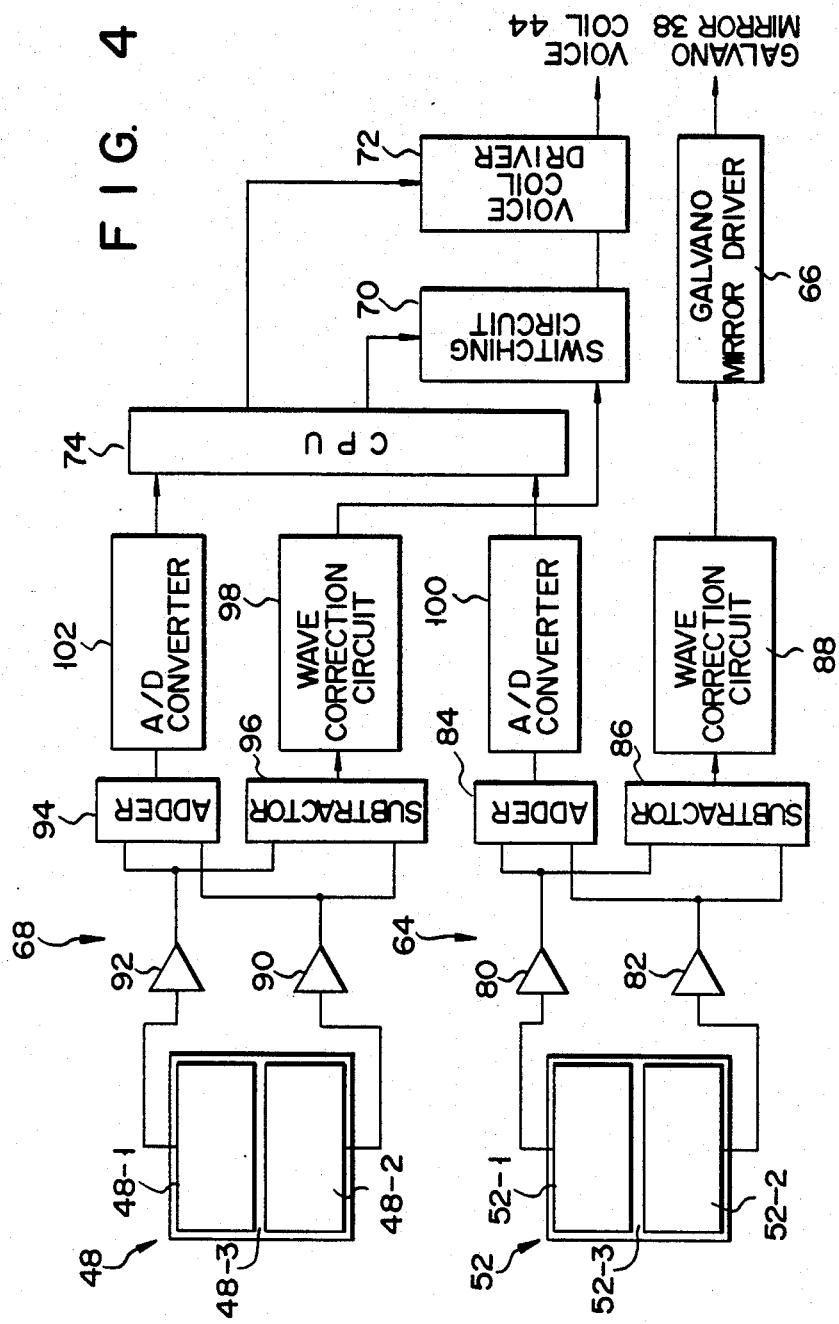

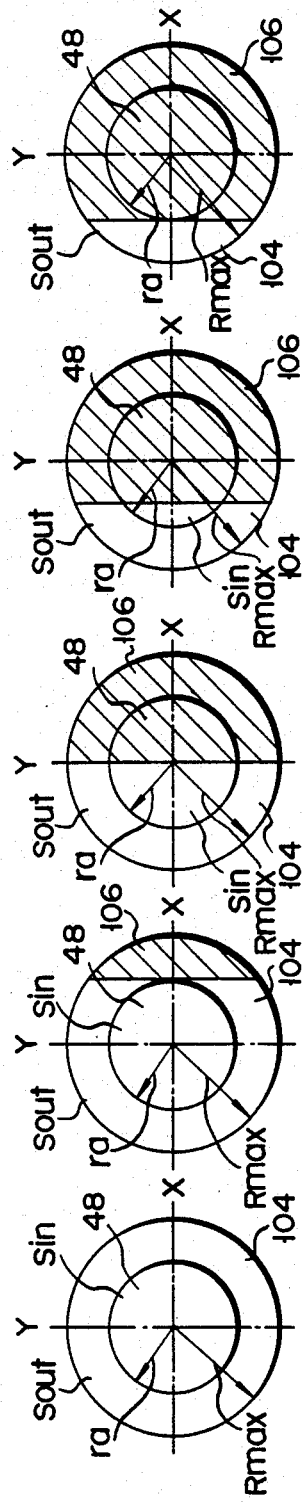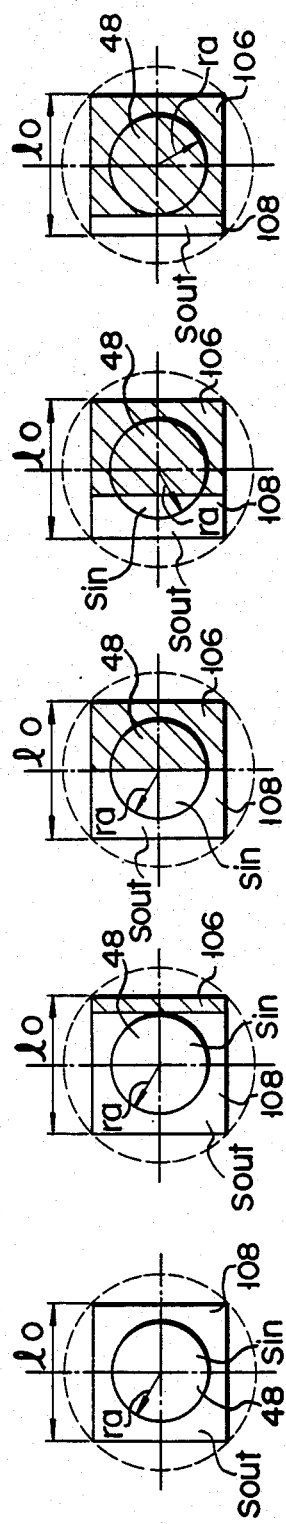

FIG. 13
FIG. 14
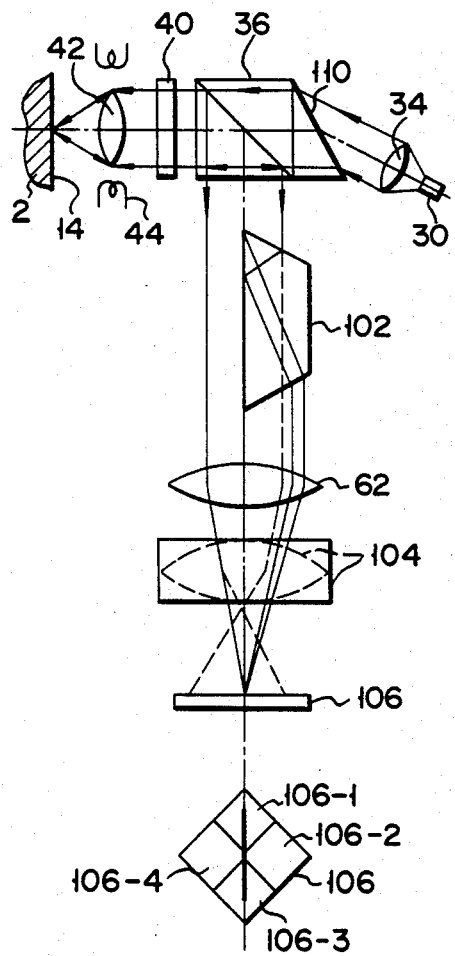
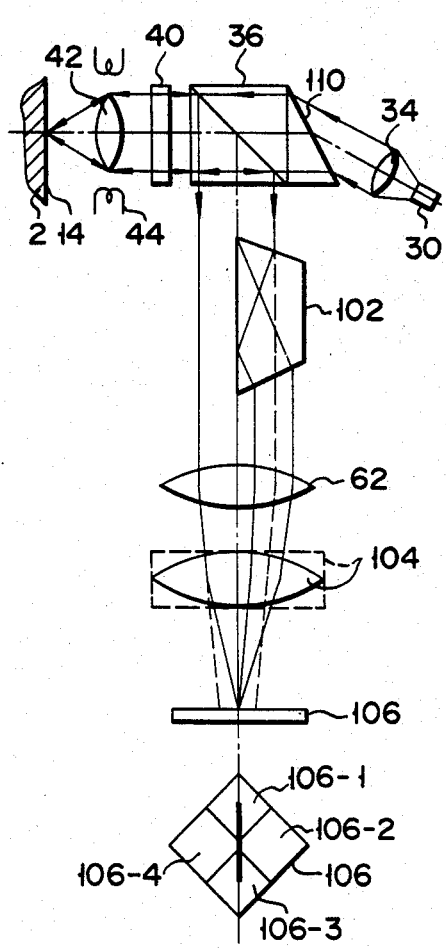

OPTICAL HEAD FOR FOCUSSING A LIGHT BEAM ON AN INFORMATION RECORDING MEDIUM

BACKGROUND OF THE INVENTION

The present invention relates to an optical head for focusing a light beam for reading or recording information onto or from an information recording medium such as an optical disk, and more particularly, to an improvement in a photo detector for an optical head for detecting a defocusing state of a light beam.

Various optical information recording/reproduction systems have been recently devised which optically write and read informtion onto and from an information recording medium (to be referred to as an optical disk hereinafter). For example, information recording/reproduction systems are known which are used for a recording medium for reproduction only such as a CD (compact disk) type of DAD or a video disk, an image file, a still image file, a COM (computer output memory) or the like. In such systems, information is recorded by establishing a state change such as forming a hole (pit) in a recording layer by a focused light beam. In other information recording/reproduction systems, information is optically written on or read from an information recording medium for recording/reproduction or from an erasable information recording medium (to be referred to as an optical disk hereinafter). In these systems, in both the write and read modes, a light beam must be always focused on the optical disk. In view of this requirement, the optical head frequently has a focus detecting system for detecting the state of focus of the light beam. Various such focus detecting systems have been proposed. For example, U.S. Ser. No. 399,873, filed on July 19, 1982 (now U.S. Pat. No. 4,521,680) and corresponding EPC application No. 82106508.3, filed on July 19, 1982 disclose a focus detecting system adopting the so-called knife edge method.

The photo signals generated by a photo detecting unit of such a focus detection system are processed by a focusing signal generator of the system and are converted into a defocus signal or into a just in-focus signal. These signals are supplied to a voice coil for driving the objective lens so that the objective lens is kept in the just in-focusing state. The focus detecting system must have a satisfactory sensitivity and stability. In a conventional optical head, if a focus detecting system is sensitive, the focus servo system is operated less stably. The conventional optical head is known to have other problems to be discussed below.

(1) Noise is generated in the focus servo loop or system due to optical or electrical disturbance. Due to this noise, the objective lens may bump against the optical disk or may be excessively separated therefrom.

(2) When there is a defect in the light reflecting layer of the optical disk or the optical path of the optical system of the focus detecting system is shielded for any reason, the laser beam may not become incident on the photo detecting unit and the objective lens may be overdriven.

(3) In a focus detecting system of a certain type, when the defocusing displacement is great, the level of the defocus signal is decreased. Then, the focus servo system may not operate normally.

SUMMARY OF THE INVENTION

It is an object of the present invention to provide a system in which a defocus state of an objective lens can be detected with a satisfactory sensitivity and the objective lens can be stably kept in the just in-focusing state.

According to the present invention, there is provided an optical head for focusing light beam on a light reflecting surface of an optical disk comprising:
means for generating a light beam;
means for transferring the light beam;
an objective lens which converts the transferred light beam into a convergent light beam with a beam waist, projects the light beam on the light-reflecting surface and transmits the light beam reflected from the light-reflecting surface; and
a photodetector having photo sensitive regions to which the light beam is directed and which generates photo signals, wherein an area of said regions of said photodetector is smaller than a portion of the beam spot which is formed outside said regions of said photodetector when said objective lens reaches a predetermined defocusing state.

BRIEF DESCRIPTION OF THE DRAWINGS

FIG. 4 is a detailed block diagram showing a focusing signal generator and a tracking signal generator;

FIGS. 11A, 11B, 11C, 11D and 11E and FIGS. 12A, 12B, 12C, 12D and to 12E are schematic representations showing the relationship between portions of a beam spot which fall inside and outside photo sensitive regions of a photo detector, respectively; and FIGS. 13 and 14 are schematic diagrams showing optical systems according to the present invention which are different from that shown in FIGS. 1 and 2.

DETAILED DESCRIPTION OF THE PREFERRED EMBODIMENT

Figure 1:
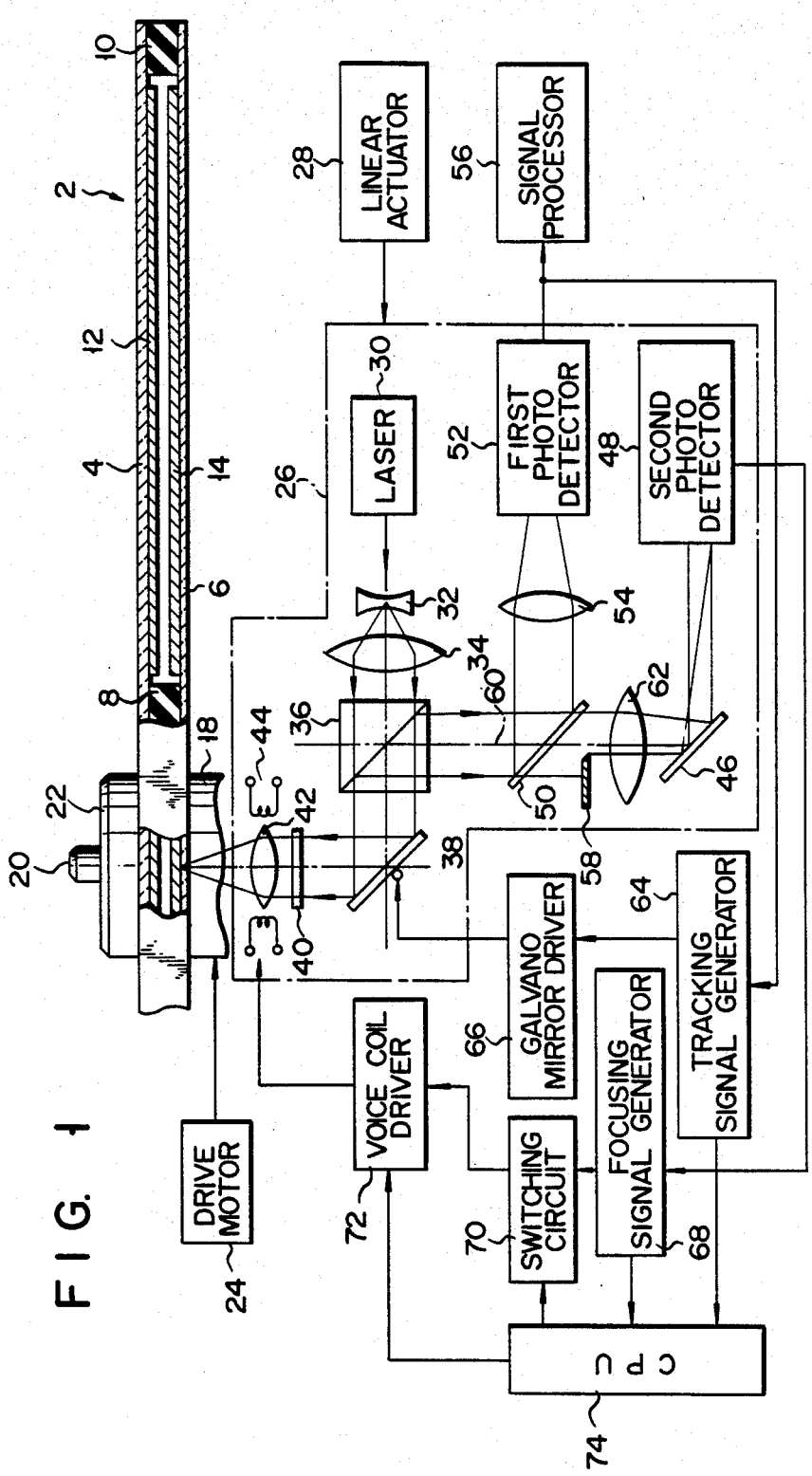
FIG. 1 is a block diagram of an optical system in which the optical head of the present invention is assembled.

An optical system for recording and reproducing information using an optical head of the present invention will now be described with reference to FIG. 1. An optical disk 2 is obtained by adhering together a pair of disk-shaped transparent plates 4 and 6 through inner and outer spacers 8 and 10. Information recording layers or light reflecting layers 12 and 14 are formed by deposition on the inner surfaces of the respective transparent plates 4 and 6. Tracking guides are formed helically or concentrically on each of the light reflecting layers 12 and 14. Information is recorded on these tracking guides in the form of pits. A hole is formed at the center of the optical disk 2. When the optical disk 2 is placed on a turntable 18, a center spindle 20 of the turntable 18 extends through this central hole of the optical disk 2, so that the centers of rotation of the turntable 18 and the optical disk 2 are aligned. A chuck device 22 is mounted on the center spindle 20 of the turntable 18 and fixes the optical disk 2 on the turntable 18. The turntable 18 is rotatably supported on a support base (not shown), and is driven at a constant speed by a drive motor 24.

An optical head 26 is arranged to be movable in the radial direction of the optical disk 2 by means of a linear actuator 28 or a rotary arm. A laser 30 for generating a laser beam is arranged inside the optical head 26. When information is to be written on the optical disk 2, the laser 30 generates a laser beam which has an intensity modulated in accordance with such information. When the recorded information is to be read from the optical disk 2, a laser beam having a constant intensity is generated from the laser 30. The laser beam from the laser 30 is diverged by a concave lens 32, collimated by a convex or collimator lens 34 into parallel light rays, and directed toward a polarization beam splitter 36. The parallel laser beams reflected by the polarization beam splitter 36 are reflected by a galvano mirror 38, become incident on an objective lens 42 through a ¼ wave plate 40 and are converged toward the light reflecting layer 14 of the optical disk 2 by the objective lens 42. The objective lens 42 is supported by a voice coil 44 to be movable along the optical axis. When the objective lens 42 is located at a predetermined position, the beam waist of the converging laser beam from the objective lens 42 is projected onto the surface of the light reflecting layer 14 to form a minimum-sized spot on the surface of the light reflecting layer 14. In this state, the objective lens 42 is kept in the just in-focusing state to allow reading and writing of information. When information is written, pits are formed on the tracking guides or preformed grooves on the light reflecting layer 14 by an intensity-modulated laser beam. When information is read out, a laser beam having a constant intensity is intensity-modulated by the pits formed in the tracking guides and is reflected thereby.

The divergent laser beam reflected from the light reflecting layer 4 of the optical disk 2 is converted into parallel light rays by the objective lens 42, which are reflected by the galvano mirror 38 and returned to the polarization beam splitter 36 through the ¼ wave plate 40. When the laser beam is returned back through the ¼ wave plate 40, the polarization plane is rotated through 90° as compared to that when the laser beam is reflected by the polarization beam splitter 36. This returned laser beam whose polarization plane is rotated through 90° is reflected by the polarization beam splitter 36 as shown in FIG. 1. The laser beam emerging from the polarization beam splitter is split by a half mirror 50. One part of the split beam is irradiated onto a first photo detecting unit 52 having photo sensitive regions 52-1, 52-2 through a convex lens 54. First signals from the first photo detecting unit 52, containing information recorded on the optical disk 2 are supplied to a signal processor 56, and are converted into digital data. The first signals are also supplied to a tracking signal generator 64 which generates a tracking signal after processing the received signals. The tracking signal is supplied to a galvano mirror driver 66, thus adjusting the inclination of the mirror 38. As a result, the laser beam is directed to the tracking guide and the beam spot is accurately positioned along the tracking guide on the light reflecting layer 14.

The other part of the beam split from the half mirror 50 is subjected to extraction by a light shielding plate or a knife edge 58 to extract only a component passing through a region spaced apart from an optical axis 60. The extracted component is passed through a projection lens 62 and becomes incident on a second photo detecting unit 48. The light shielding plate 58 may be replaced by a prism, an aperture or a slit. A signal from the second photo detecting unit 48 is processed by a focusing signal generator 68. A focusing signal from the focusing signal generator 68 is supplied to a voice coil drive circuit 72 through a switching circuit 70. In response to the focusing signal, the voice coil drive circuit 72 drives the voice coil 44 and keeps the objective lens 42 in the just in-focusing state.

In the optical system described above, when the objective lens 42 is in the position corresponding to a predetermined defocusing deviation or displacement, the switching circuit 70 is turned on in response to an ON signal supplied from a CPU 74. Therefore, the focus servo loop consisting of the voice coil 44, the voice coil drive circuit 72, the focusing signal generator 68 and the second photo detecting unit 48 is closed, so that the objective lens 42 is moved to the optimal position. However, as will be described in detail later, when the objective lens 42 comes closer than a predetermined distance to the optical disk 2, or is spaced apart from the optical disk 2 by a distance exceeding a predetermined distance, the level of the focusing signal supplied to the CPU 74 from the focusing signal generator 68 or the tracking signal generator 64 becomes lower than the predetermined value. The CPU 74 detects this decrease in level of the focusing signal and supplies an OFF signal to the switching circuit 70. As a result, the switching circuit 70 is turned off to open the focus servo loop. When the focus servo loop is opened, an alarm signal from the CPU 74 actuates the voice coil drive circuit 72. The objective lens 42 is shifted to the initial position at the predetermined distance from the light reflecting layer 14. After the objective lens 42 has been moved toward the light reflecting layer 14 to the predetermined distance therefrom, the servo loop is closed again.

The optical system illustrated in FIG. 1 will now be described in detail with reference to FIG. 2 and FIG. 3A to FIG. 3C.

Figure 2:
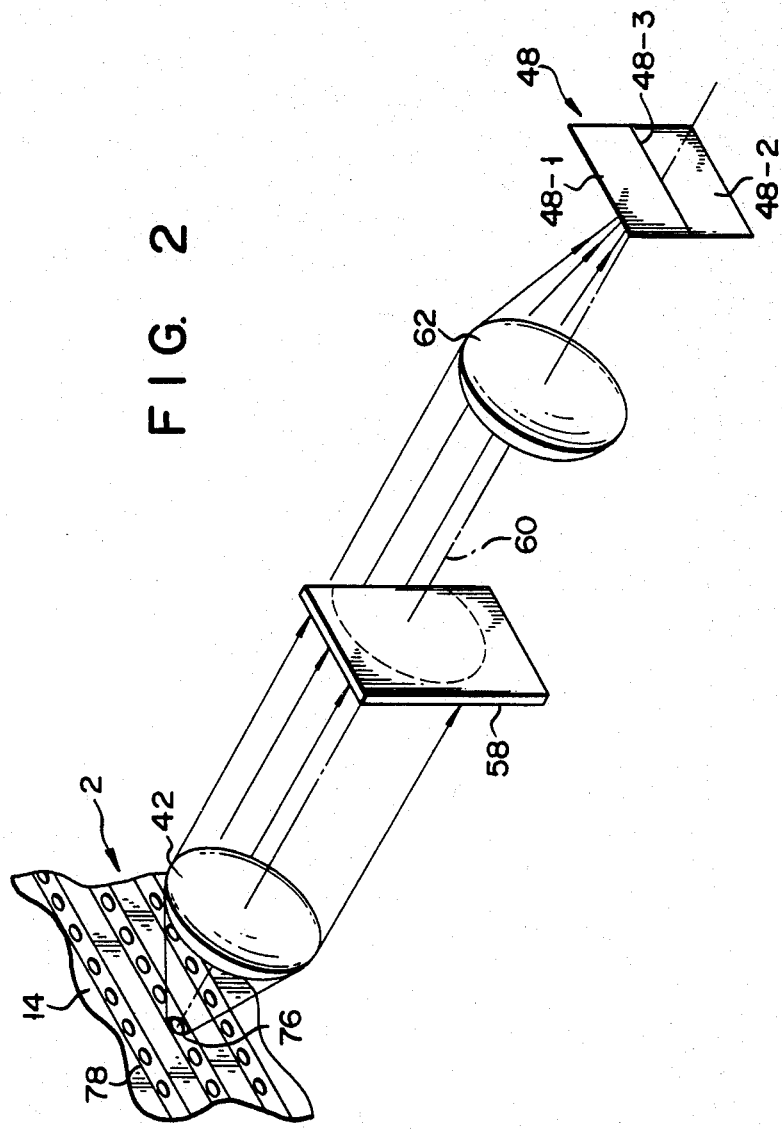
FIG. 2 is a simplified view of the optical system of the optical head shown in FIG. 1.
Figure 3A:
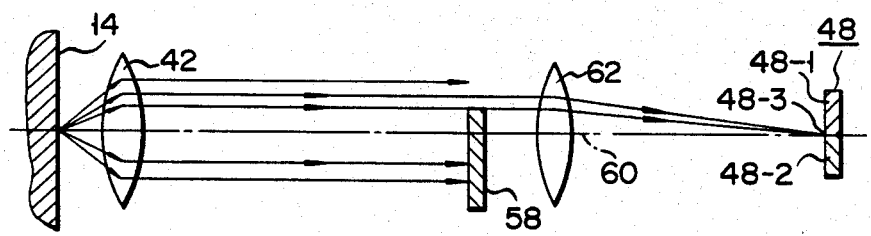
FIGS. 3A, 3B, 3C and 3D show a path of a laser beam in the optical system shown in FIG. 2 in the just in-focusing state and in various defocusing states.
Figure 3B:
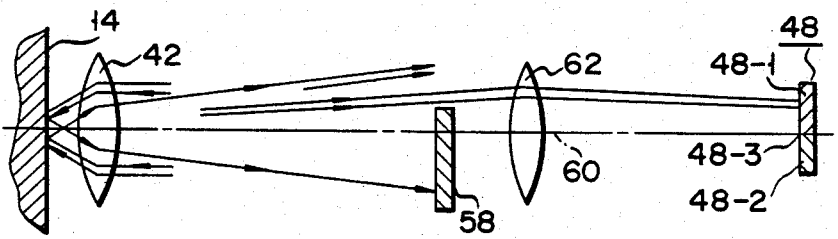
Figure 3C:
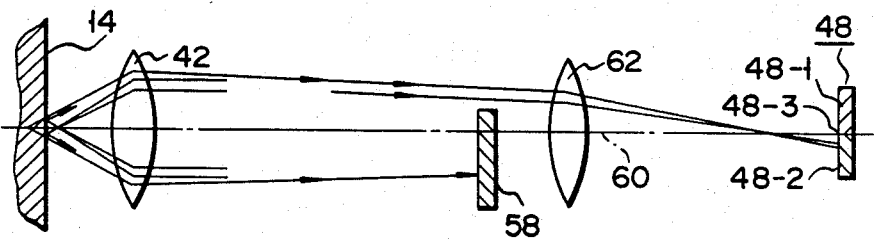

The optical system for detecting the just in-focusing state shown in FIG. 1 is shown simplified in FIG. 2. The path of the laser beam associated with the just in-focusing state and with defocusing states within a defocusing allowance is drawn as shown in FIGS. 3A to 3C. When the objective lens 42 is in the just in-focusing state, the beam waist is projected onto the light reflecting layer 14. A minimum-sized beam spot, i.e., the beam waist spot 76 or a spot slightly larger than this spot, is formed on the light reflecting layer 14. Since the laser beam which becomes incident on the objective lens 42 from the laser unit 30 consists of parallel rays, the beam waist is formed at the focal point of the objective lens 42. However, if the laser beam incident on the objective lens 42 from the laser 30 is slightly divergent or convergent, the beam waist is formed in the vicinity of the focal point of the objective lens 42. In the optical system shown in FIGS. 1, 2, and 3A to 3C, photo sensitive regions 48-1 and 48-2 and a photo insensitive region 48-3 of a photo detecting unit 48 are on or only slightly deviated from the image forming plane of the beam waist spot 76 in the just in-focusing state. Therefore, in the just in-focusing state, the beam waist spot image or pattern is formed on the photo insensitive region 48-3 between the photo sensitive regions 48-1 and 48-2 of the photo detecting unit 48. Thus, as shown in FIG. 3A, the beam waist spot 76 is formed on the light reflecting layer 14. The laser beam reflected by the light reflecting layer 14 is converted into parallel light rays by the objective lens 42, and the parallel light rays are directed to the light shielding plate 58. The part of the parallel light rays are blocked by the light shielding plate 58 and the other light component is extracted by the light shielding plate 58, focused by the projection lens 62, and focused to a minimum diameter on the photo detecting unit 48. Thus, the beam waist spot image or pattern is formed on the photo detecting unit 48. At this time, the levels of the signals from the photo sensitive regions 48-1 and 48-2 of the photo detecting unit 48 are kept to be substantially the same. When the objective lens 42 draws closer to the light reflecting layer 14, the beam waist is formed after reflection of the laser beam by the light reflecting layer 14, as shown in FIG. 3B. Thus, the beam waist is formed between the objective lens 42 and the light reflecting layer 14. In this defocusing state, the beam waist is generally formed within the focal length of the objective lens 42. As may be apparent, assuming that the beam waist serves as a light spot, a laser beam reflected by the light reflecting layer 14 and emerging from the objective lens 42 is converted into a divergent laser beam by the objective lens 42. Since the laser beam component extracted by the light shielding plate 58 is also divergent, even after being converged by the projection lens 62, it is not focused to a minimum size on the regions 48-1, 48-2 and 48-3 of the photo detecting unit 48, but is focused at a point further away than the photo detecting unit 48. Accordingly, such a laser beam component is projected onto the photo detecting unit 48 in a region above the optical axis 60. A beam spot image or pattern larger than the beam waist spot image is formed on the regions 48-1 to 48-3. A signal from the first photo sensitive region 48-1 becomes lower in level than that from the second photo sensitive region 48-2. A differential signal of the two signals is generated by the focusing signal generator 68 as a focusing signal. When the objective lens 42 draws even closer to the light reflecting layer 14, a larger beam spot image or pattern is formed extending beyond the first photo sensitive region 48-1. When the objective lens 42 is spaced apart from the light reflecting layer 14, as shown in FIG. 3C, the laser beam is reflected by the light reflecting layer 14 after forming a beam waist. In such a defocusing state, the focal length of the objective lens 42 generally lies beyond the beam waist which is formed between the objective lens 42 and the light reflecting layer 14. The reflected laser beam directed toward the light shielding plate 58 from the objective lens 42 is thus convergent. The laser beam extracted by the light shielding plate 58 is further converged by the projection lens 62 and is projected onto the regions 48-1, 48-2 and 48-3 of the photo detecting unit 48 after forming a beam waist spot. As a result, a pattern larger than the beam waist spot image is formed in the regions 48-2 and 48-3 of the photo detecting unit 48.

The tracking signal generator 64 and the focusing signal generator 68 will now be described with reference to FIG. 4. The photo signals respectively generated from the first and second photo sensitive regions 52-1 and 52-2 of the first photo detecting unit or detector 52 are amplified by preamplifiers 80 and 82, respectively, and the amplified signals are supplied to both an adder 84 and a subtractor 86. A differential signal of the two photo signals generated from the subtractor 86 is wave-shaped by a wave correction circuit 88 and is supplied as a tracking signal to the galvano mirror driver 66. Therefore, when the galvano mirror driver 66 drives the galvano mirror 38, the laser beam is reflected by the galvano mirror 38 and is directed toward a tracking guide 78. Thus, the tracking guide 78 is traced by the laser beam. The photo signals respectively generated from the first and second photo sensitive regions 48-1 and 48-2 of the second photo detecting unit or detector 48 are amplified by preamplifiers 90 and 92, respectively, and amplified signals are supplied to both an adder 94 and a subtractor 96. A differential signal of the two photo signals generated by the subtractor 96 is wave-shaped by a wave correction circuit 98 and is supplied as a focusing signal to the voice coil drive circuit 72 through the switching circuit 70. Therefore, when the voice coil drive circuit 72 drives the voice coil 44, the objective lens 42 is shifted along the optical axis 60 and kept in the just in-focusing state. An output signal from the adder 84 for adding the two photo signals from the first detecting unit 52 is supplied to the CPU 74 through an A/D converter 100. An output signal from the adder 94 for adding the two photo signals from the second photo detecting unit 48 is also supplied to the CPU 74 through an A/D converter 102. When one or both of the levels of the output signals from the adders 84 and 94 exceed the predetermined level, the CPU 74 detects that the objective lens 42 is in a defocusing state within the defocusing allowance, and generates an ON signal to turn on the switching circuit 70. Conversely, when one or both of the levels of the output signals from the adders 84 and 94 are lower than the predetermined level, the CPU 74 detects that the objective lens 42 is in the undefocusing state outside the defocusing allowance, and turns off the switching circuit 70 to open the focusing servo loop. At this time, the CPU 74 supplies an alarm signal to the voice coil drive circuit 72 to drive the voice coil 44 such that the objective lens 42 is moved to the predetermined position within the defocusing allowance.

Figure 5:
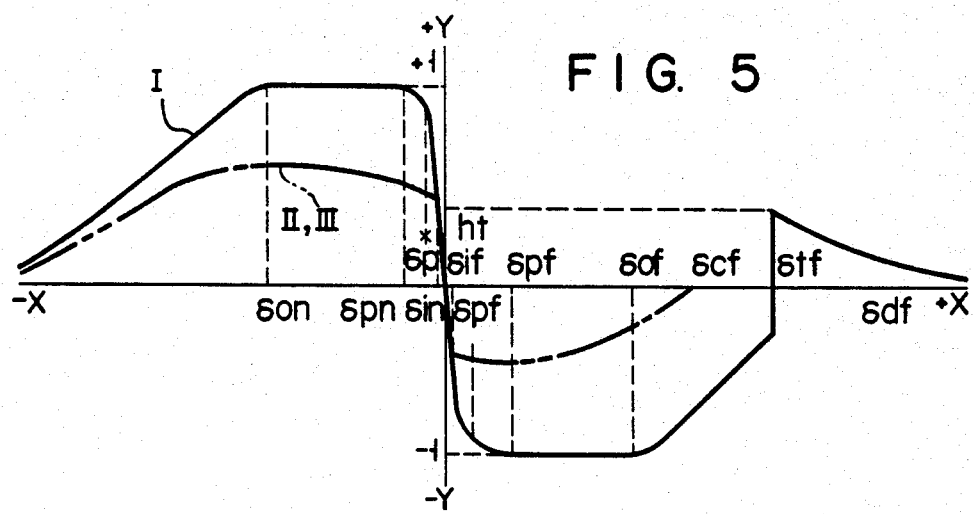
FIG. 5 is a graph showing the differential signal from a subtractor as a focusing signal generator as a function of defocusing deviation $\delta$.
Figure 6:
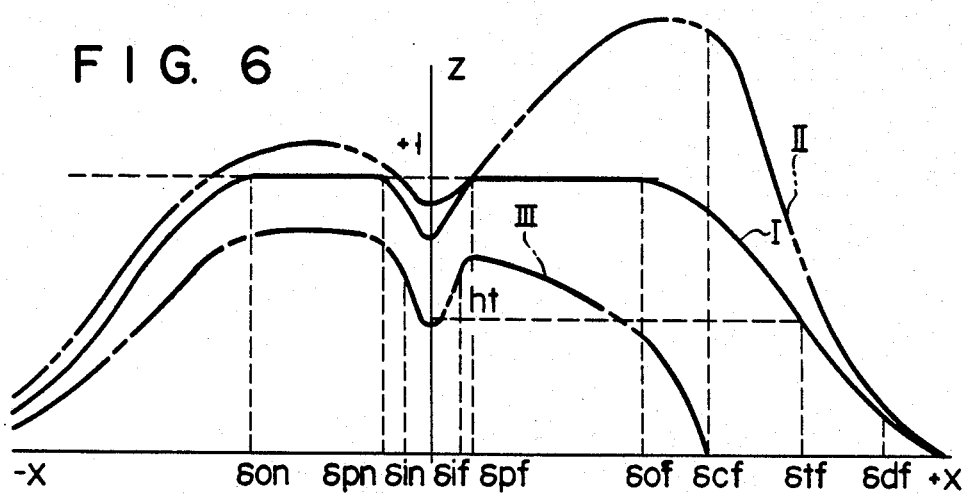
FIG. 6 is a graph showing the sum signal from an adder as a focusing signal generator as a function of defocusing deviation $\delta$.

Changes in the sum signal and the differential signal corresponding to the position of the objective lens 42, i.e., to the defocusing value, will be described in detail with reference to FIGS. 5 and 6. Both signals are obtained from the photo signals from the second photo detecting unit 48 in the focus detecting system, i.e., in the knife edge method shown in FIGS. 1 to 3. FIG. 5 shows the relationship between a differential signal Y and a defocusing displacement X, and FIG. 6 shows the relationship between a sum signal Z and the defocusing displacement X. Referring to FIGS. 5 and 6, the distance between the current position of the objective lens and that in the just in-focusing state, hence, the defocusing displacement X, is plotted along the axis of abscissa.

Figure 3D:
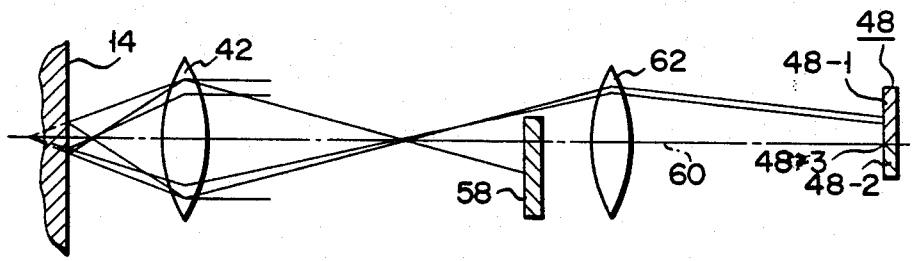

Note +X denotes the distance between the light reflecting layer 14 and the objective lens 42 moving in the direction away from the light reflecting layer 14, and −X denotes the distance between the layer 14 and the objective lens 42 in the direction toward the light reflecting layer 14. Y and Z plotted along the axis of ordinate respectively denote the levels of the differential signal from the subtractor 96 and the sum signal from the adder 94 with reference to the saturation level indicated by curve I. The curve I indicated by the solid line corresponds to the case wherein the edge of the light shielding plate 58 coincides with the optical axis 60. Curve II corresponds to the case wherein the edge of the light shielding plate 58 is displaced from the optical axis 60 to interrupt light rays at a distance from the optical axis 60. Curve III corresponds to the case wherein light rays passing along the optical axis 60 are not interrupted by the plate 58. As can be seen from the curve I of FIG. 5, the rise characteristics of the defocusing signal corresponding to the defocusing displacement X are abrupt near the just in-focusing position (X=0), as compared with other defocusing detection methods. The level of the defocusing signal reaches 80% of the saturation level at the position $\delta_{if}$ or $\delta_{in}$ of the defocusing displacement, and is saturated at the position $\delta_{pt}$ or $\delta_{pn}$ thereof. In addition, when slight defocusing occurs, the beam spot on the photo detecting unit is enlarged to extend outside the photo sensitive regions of the photo detecting unit at the position $\delta_{of}$ or $\delta_{on}$. Therefore, when defocusing occurs at a position outside the positions $\delta_{of}$ and $\delta_{on}$, a sum Z of the defocusing signal Y and the amount of the detected light is reduced in proportion of the area of the beam spot extending outside the photo sensitive regions of the photo detecting unit. However, when the objective lens 42 is spaced further apart from the light reflecting layer 14 of the optical disk 2 than the predetermined distance, the laser beam directed from the objective lens 42 to the projection lens 62 is converged therebetween, as shown in FIG. 3D, so that the divergent laser beam becomes incident on the projection lens 62, as in the case of FIG. 3B. Therefore, the laser beam coverged by the projection lens 62 is projected onto the first photo sensitive region 48-1 of the photo detecting unit 48 so that the focusing signal from the subtractor 96 changes in the positive direction at the position $\delta_{tf}$, as indicated by the curve I of FIG. 5. This means that the same focusing signal as that in the case wherein the objective lens 42 is too close to the optical disk 2 may be erroneously generated even though the objective lens 42 is spaced apart from the optical disk 2. For this reason, the defocusing allowance must be kept within the range defined by the distance $\delta_{tf}$ on the characteristic curve I. As is easily seen from FIG. 6, while the objective lens 42 is in the just in-focusing state, the beam spot is formed on the photo insensitive region 48-3 of the photo detecting unit 48 so that the level Z of the sum signal becomes lower.

Figure 7:
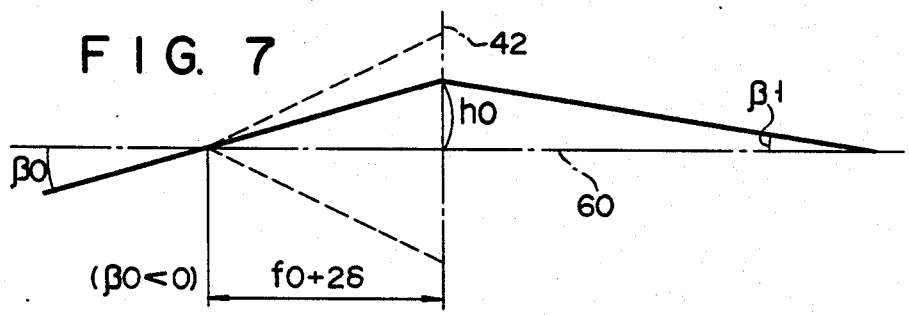
FIG. 7 is a view showing the geometric path of light from a light source passing through the objective lens shown in FIG. 2.

A change in the path of the laser beam can be explained geometrically/optically as follows. A deviation h2 of the laser beam component on the photo detecting unit 48 from the optical axis can be determined. The geometric/optical imaging system of the objective lens 42 is as illustrated in FIG. 7. Referring to FIG. 7, f0 represents the focal length of the objective lens 42 and $\delta$ represents the defocusing displacement of the objective lens 42, that is, a change in the distance thereof when a change from the just in-focusing state to the defocusing state is made. In FIG. 7, the laser beam path indicated by the solid line emerges from the beam waist, passes through a point on the principal plane of the objective lens 42 which is a distance h0 away from the optical axis 60, and is focused. In the just in-focusing state shown in FIG. 3A, $\delta=0$. In the defocusing state shown in FIG. 3B, the objective lens 42 draws closer to the optical disk 2 by the displacement distance $\delta$. Since the beam waist is formed by the laser beam reflected from the light reflecting layer 14, the beam waist comes closer to the objective lens 42 by double the displacement distance $\delta$ (in this case, $\delta<0$). In the defocusing state shown in FIG. 3C, the objective lens 42 is spaced further apart from the optical disk 2 by the displacement distance $\delta$, and the laser beam is reflected from the light reflecting layer 14 after the beam waist is formed. Accordingly, this is basically similar to the state wherein the beam waist is formed behind the light reflecting layer 14. Thus, the beam waist is spaced apart from the objective lens by the distance $2\delta$. In the just in-focusing state, if the beam waist is formed at the focal point of the objective lens 42 and the objective lens 42 is then moved further apart from the optical disk 2 by the distance $\delta$, the distance between the beam waist and the principal plane of the objective lens 42 is represented by $(f0+2\delta)$. When the beam waist is regarded as a point, angles $\beta 0$ and $\beta 1$ shown in FIG. 5 are given by equations (1) and (2) below:

$$h0/(f0+2\delta)=\tan(-\beta 0)\approx -\beta 0 \quad (1)$$

From the lens imaging theorem, $$\tan(-\beta 0)/h0+\tan \beta 1/h0=1/f0$$

Therefore, $$\beta 1=\beta 0+h0/f0=h0/(f0+f0^2/2\delta) \quad (2)$$

Figure 8:
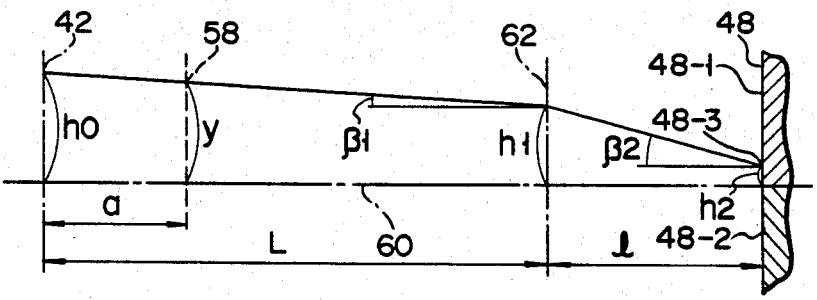
FIG. 8 is a view showing the geometric path of light from a light source passing through a projection lens system shown in FIG. 2.

FIG. 8 shows the geometric path of light in the optical system of the projection lens 62. It is also assumed that the respective lens 62 has a focal length f1, the light shielding plate 58 is arranged at a distance a from the principal plane of the objective lens 42, the principal plane of the lens 66 is arranged at a distance L from that of the objective lens 42, and the principal plane of the lens 62 is arranged at a distance l from the regions 48-1, 48-2 and 48-3 of the photo detecting unit 48. The path indicated by the solid line is the path of light rays which are converged by the objective lens 42 and which then pass through the light-transmitting plane of the light shilding plate 58 the edge of which is apart from the optical axis by a distance y.

The distance y is given by equation (3) below:

$$y=h0-a\beta 1=h0\{1-a\cdot 1/(f0+f0^2/2\delta)\} \quad (3)$$

If we assume $F(\delta)=(f0+f0^2/2\delta)^{-1}$, equation (3) can be rewritten as:

$$y=h0(1-aF(\delta)) \quad (4)$$

Therefore, $$h0=y/(1-aF(\delta)) \quad (5)$$

A distance h1 of the path of the transmitted light component from the optical axis 60 at the principal plane of the lens 62 is given by equation (6) below:

$$h1 = y - (L-a)\beta 1 = \{(1-LF(\delta))/(1-aF(\delta))\} \cdot y \quad (6)$$

Angle $\beta 2$ can be calculated in a similar manner as in the case of angle $\beta 1$ in equation (2) as follows:

$$\beta 2 = \beta 1 + h1/f1 = \{y/(1-aF(\delta))\}\{1/f1 + (1-L/f1)F(\delta)\} \quad (7)$$

The distance or deviation h2 from the optical axis 60 of the transmitted light component at the photo region of the phot detecting unit 48 is given by equations (8) to (10) below:

$$h2 = h1 - H\beta 2 = \{y/(1-aF(\delta))\}\{(1-l/f1) - [l+L(1-l/f1)]\times F(\delta)\} \quad (8)$$

When $l=f$, equation (8) can be rewritten as:

$$h2 = -y \cdot f1 \cdot F(\delta)/\{1-aF(\delta)\} = \pm mf0y/\{(a-f0) - f0^2/2\delta\} \quad (9)$$

Note that m is a transverse magnification factor and is obtained from $\pm m = -\beta 0/\beta 2$. Thus, $+m$ represents the case of inverted image, and $-m$ represents the case of an erect image.

In the optical system shown in FIG. 6, it is assumed that the beam waist is formed at the focal point of the objective lens 42. However, when a divergent or convergent laser beam is incident on the objective lens 42, the position of the beam waist is deviated from the focal point of the objective lens 42 by a distance b.

Figure 9:
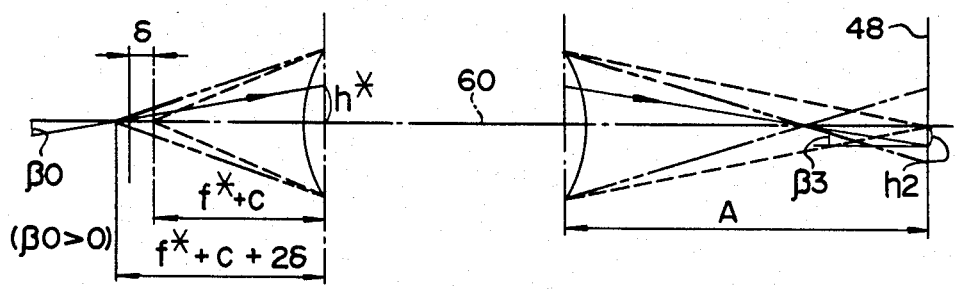
FIG. 9 is a view showing the geometric path of light when the lenses shown in FIGS. 7 and 8 are replaced with a single synthetic lens.

When it is assumed that the lens system for processing the light which is reflected by the light reflecting layer 14 of the optical disk 2 and reaches the photo detecting unit 48 through the objective lens 42 and the projection lens 62 is a single compound lens, the calculation to be described below can be performed in place of the calculation described above. That is, the optical path of the reflected light obtained when the beam waist position is deviated from the focal point of the objective lens 42 by the distance $\delta$ is calculated in accordance with equations up to equation (9), assuming that the focal length of the single compound lens is $f^*$ and the distance from the front focal point of the single compound lens to the optical disk 2 when the just in-focusing state is established (focused laser beam) is C. When the objective lens 42, a projection lens 62, and the like are all considered as a single synthetic lens, we have from FIG. 9:

$$h^*/(f^* + C + 2\delta) = \tan(-\beta 0) \approx -\beta 0$$

Thus, $$h^* = -\beta 0 \cdot (f^* + C + 2\delta) \quad (10)$$

Also, $$\beta 2 = \beta 0 + h^*/f^* = \{\beta 0 - \beta 0 - (C+2\delta)\beta 0/f^*\} = -\beta 0(C+2\delta)/f^* \quad (11)$$

When the second photo detecting unit 48 is arranged at the image forming plane when the focused point of the laser beam and the position of the light reflecting layer 14 of the optical disk 2 coincide with each other (when $\delta = 0$), we have h2=0. The transverse magnification factor m at this time is obtained from $\pm m = -\beta 0/\beta 2$ to be $m = \pm f^*/C$.

Therefore, $$C = \pm f^*/m \quad (12)$$

Note that m is assumed to be always a positive number. Thus, $+m$ represents the case of an inverted image, and $-m$ represents the case of an erect image.

When the distance from the rear principal point of the compound lens to the second photo detecting unit 70 is represented by A, we have:

$$h2 = h^* - A\beta 2 = \beta 0\{(\pm A/m - f^* \pm f^*/m) + (A/f^* - 1)\times 2\delta\} \quad (13)$$

For any value of $\beta 0$ and for $\delta = 0$, from h2=0, we have:

$$A = f^*(1+m) \quad (14)$$

Substitution of equation (14) in equation (13) provides:

$$h2 = \beta 0\{f^*(1+m)/f^* - 1\}\times 2\delta = \pm 2m\delta \times \beta 0 \quad (15)$$

Substitution of equations (1) and (5) in equation (15), following equations (16) and (17) are established.

$$h2 = \pm mf0y/(a - f0 - f0^2/2\delta) \quad (16)$$

$$h2 = \pm (2my/f0)\delta \quad (17)$$

Figure 10:
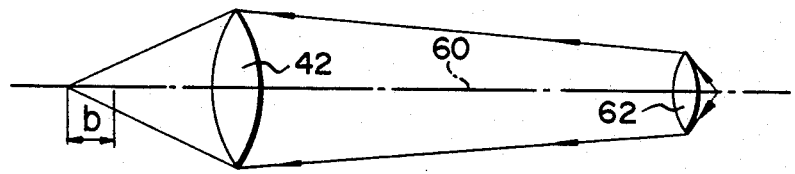
FIG. 10 is a diagram showing the path of the light when the beam spot or waist is not formed at the focal point of the objective lens but at a position deviated slightly therefrom.

As shown in FIG. 10, when the laser beam incident on the objective lens 42 is convergent or divergent, and the focused point of the laser beam is deviated from the focal point of the objective lens 42 by the distance b, conversion in equations (1) to (9) of:

$$2 \to 2\delta + b$$

allows establishment of the proper equations. Accordingly, from equation (5), we have:

$$h0 = \{[f0 + f0^2/(2\delta + b)]/[f0 + f0^2/(2\delta + b) - a]\}\times y \quad (18)$$

Substitution of equation (18) in equation (1) yields:

$$\beta 0 = -h0/(f0 + 2\delta + b) = -[f0 \cdot h0/(2\delta + b)]/[f0 + f0^2/(2\delta + b)] = f0 \cdot y/\{(2\delta + b)/[f0 + f0^2/(2\delta + b) - a]\} = -f0 \cdot y/\{f0^2 + (f0 - a)(a\delta + b)\} = -y/\{f0 + (1 - a/f0)(2\delta + b)\} \quad (19)$$

Substitution of equation (12) in equation (15) provides:

$$h2 = \pm 2my\delta/\{f0 + (1 - a/f0)(2\delta + b)\} \quad (20)$$

If $a = 0$, $$h2 = \pm 2my\delta/(f0 + b + 2\delta) \quad (21)$$

If $f0 + b >> 2\delta$, $$h2 \approx \pm 2my\delta/(f0 + b) \quad (22)$$

Equations (9), (10), (13), (15), (16) and (17) indicate that when the focal point of the objective lens 42 is deviated from the light reflecting layer 14 of the optical disk 2 by the distance $\delta$, the beam spot formed on the photo sensitive regions 48-1 and 48-2 of the photo detecting unit 48 is geometrically deviated from the optical axis 60 for the distance h2.

It is assumed that the radius of the opening or the exit pupil of the objective lens 42 is represented by A, the distance between the principal point of the objective lens 42 closer to the optical disk 2 and the focused point or the beam waist toward the optical disk 2 is represented by F, and the transverse magnification factor of the photo detecting unit 48 in the just in-focusing state is represented by m. When the knife edge or light shielding plate 58 is not in the optical path and the distance between the optical disk 2 and the objective lens 42 deviates from that in the just in-focusing state by the distance δ, the beam spot on the photo detecting unit 48 becomes a circle having a radius R0. The radius R0 is given from equation (21) above as:

$$R0 = |Am/(F+2\delta) \times 2| \qquad (23)$$

for $a=0$, $f0+b=F$, and $h2=R$.

When the range in which the objective lens 42 can be moved or worked in its optical axis from the position corresponding to the just in-focusing state toward the optical disk 2, that is, the working distance, is represented by WD and when the objective lens 42 moves by a distance WD/2, so becoming defocused, a R1 radius of the beam spot on the photo detecting unit 48 can be given from equation (23) above as:

$$R1 = AmWD/(F-WD) \qquad (24)$$

The movable range of the objective lens 42 is predetermined. Therefore, when a defocusing displacement of a distance of WD/2 occurs and the beam spot of the radius R1 is projected onto the photo detecting unit 48, the beam spot must be able to extend to outside the photo sensitive regions 48-1 and 48-2 and the photo insensitive region 48-3 with sufficient margins. In other words, the sizes of the photo sensitive regions 48-1 and 48-2 and the photo insensitive region 48-3 must be determined with reference to the beam spot having the radius R1. The detection sensitivity of the photo detecting unit 48 is not constant, and the light reflecting layer 14 of the optical disk 2 does not have a uniform reflectance over the entire surface of the optical disk 2. When these two factors are considered, the alarm and OFF signals to be supplied from the CPU 74 must have levels which are substantially equal to half the maximum level of the sum signal from the adder 94. Therefore, when the beam spot having the radius R1 and formed by a laser beam of uniform intensity distribution is projected onto the photo detecting unit 48, the area of the portion of the beam spot which is formed on the photo sensitive regions 48-1 and 48-2 must be greater than that formed outside these regions.

FIGS. 11A to 11E schematically show the relationship between the photo detecting unit 48 and the beam spot size. As described above, when the objective lens 42 is located at a positon deviated toward the optical disk 2 from that in the just in-focusing state by the distance WD/2, a beam spot 104 must largely extend outside the photo sensitive regions 48-1 and 48-2 and the photo insensitive region 48-3. For this purpose, an area Sin of the portion of the beam spot 104 which is formed on the photo detecting unit 48 and an area Sout of the portion of the beam spot 104 which is formed outside the photo sensitive regions 48-1 and 48-2 of the photo detecting unit 48 must satisfy a relation Sin≦Sout. When the area of the photo sensitive regions 48-1 and 48-2 is roughly defined by a circle having a radius ra, the following relation is established:

$$\pi ra^2 \leq (\tfrac{1}{2})\pi R1^2$$

When the light shielding plate 58 is located in the light path, a dark portion 106 is formed in the beam spot 104 as shown in FIGS. 11B to 11E. In practice, the size of the beam spot 104 is then reduced. When the radius ra of the area of the photo sensitive regions 48-1 and 48-2 is determined to be $(1/\sqrt{2})R1$, Sin=Sout is satisfied in the beam spot 104 shown in FIG. 11A, Sin>Sout is satisfied in the beam spot 104 shown in FIG. 11B. Sin≦Sout is satisfied in the beam spot 104 shown in FIG. 11C. Sin<Sout is satisfied in the beam spot 104 shown in FIG. 11D. Sin=0 (Sout≠0) is satisfied in the beam spot 104 shown in FIG. 11E. The following is established from the above relations. In order to satisfy Sout≦Sin for the defocusing displacement $\delta = -WD/2$ irrespective of whether the light shielding plate 58 is located in the optical path, the radius ra which satisfies Sout=Sin for a maximum radius Rmax of the beam spot is calculated and the photo detecting unit 48 is designed such that the photo sensitive regions 48-1 and 48-2 are arranged within the radius ra.

The total area (Sin+Sout) of the beam spot 104 shown in FIG. 11B is given by:

$$Sin+Sout = \int \sqrt{R1^2+x^2}\,dx = (\tfrac{1}{2})\{(x\sqrt{R1^2-x^2}+R^2 \sin(x/R)\} + C$$

where x represents an X-coordinate of a boundary position between the hatched dark region and a bright region. The area of the dark region is given by:

$$2\int_0^{ra} \sqrt{R1^2 - x^2}\,dx = [x\sqrt{R1^2-x^2} + R1\sin^{-1}(x/R)]_0^{ra}$$
$$= ra\sqrt{R1^2 - ra^2} + R1^2 \sin^{-1}(ra/R)$$

Therefore, in order to establish the relation Sin=Sout, the following relation must be satisfied:

$$\pi R1^2/2 + ra\sqrt{R1^2-ra^2} + R1^2 \sin^{-1}(ra/R1) = 2\pi ra^2$$

The radius ra can then be calculated from this relation. Since the relation of ra above is complicated, a simplified relation will be discussed below. The size of the photo sensitive regions is determined such that $Sout > S^* \geq Sin$ is satisfied for $\delta = -WD/2$. In other words, in place of the beam spot 104 having the radius R1, a square beam spot 108 inscribed in the beam spot 104 is considered as a generalization model as shown in FIGS. 12A to 12E, and the size of the photo sensitive regions 48-1 and 48-2 is determined in accordance with this beam spot 108. When the length of one side of the square beam spot 108 inscribed in the beam spot 104 is given by l0, from $\sqrt{2l} = 2R1$, we have:

$$l0 = \sqrt{2R1} \qquad (25)$$

The radius ra for satisfying $Sout > = Sin$ in FIG. 12B and for ra>0 is given as a solution:

$$ra = (l0 + \sqrt{l0^2 + 4\pi l^2})/4\pi = (1+\sqrt{1+4\pi})l0/4 \qquad (26)$$

of equations:

$$l0 \times (l0/2 + ra) = 2\pi ra^2$$

$$2\pi ra^2 - l0 ra - l^2/2 = 0$$

Substitution of equations (25) and (24) in equation (26) yields:

$$ra = (1+\sqrt{1+4\pi})R1/2\sqrt{2\pi} = \{(1+\sqrt{1+4\pi})/2\sqrt{2\pi}\} \times \{AmWD/(F-WD)\} \quad (27)$$

Thus, the size of the photo sensitive regions 48-1 and 48-2 is determined such that they fall within the circle having the radius ra given by equation (27).

In the embodiment described above, when the objective lens 42 is moved from the position corresponding to the just in-focusing state toward the optical disk 2 by the distance WD/2, the objective lens 42 is located outside the defocusing allowance and a defocusing state is detected. If the objective lens 42 starts to be moved toward the optical disk 2 under no control, the abnormality is detected after displacement by the distance WD/2 and a stop signal is supplied. However, the objective lens 42 is stopped only after it has moved to a position significantly close to the optical disk 2 due to the inertia of the objective lens 42.

Furthermore, as the optical disk 2 is rotating with relatively large deflection and distortion, it approaches or is separated from the frame of the optical head at a considerably high speed. Therefore, if the timings of the two members are not well controlled, the objective lens 42 and the optical disk 2 may collide upon abnormal detection. Therefore, in order to provide a large margin, the CPU 74 preferably supplies an alarm signal and an OFF signal after it determines a defocusing state when the objective lens 42 is moved from the just in-focusing state toward the optical disk 2 by a distance WD/4. The reference level for generating the alarm signal and the OFF signal is preset to be about half the maximum value of the sum signal from the adder 94 in the embodiment. However, as has been described above, when the objective lens 42 is in the just in-focusing state, a laser beam is projected toward the photo insensitive region 48-3 of the photo detecting unit 48, the beam spot is mostly formed in the photo insensitive region 48-3, and only part of the beam spot is formed on the photo sensitive regions 48-1 and 48-2. Therefore, as can be seen from the graph in FIG. 6, the level of the sum signal from the adder 94 is reduced. If the reference level for generating the alarm signal and the OFF signal is too high, the objective lens 42 in the just in-focusing position is erroneously detected to be in a defocusing state. Then, the CPU 74 generates the alarm and OFF signals. In addition, in the above embodiment, it is assumed that the laser beam has a uniform optical intensity distribution. However, in practice, the light intensity distribution of the laser beam is dependent on the optical system involved. A laser beam may, for example, have a Gaussian distribution wherein the intensity at the center is higher than that at the outer periphery. Then, even if the condition that Sin=Sout is satisfied, the level of the sum signal from the adder 94 in the defocusing state may become equal to or more than that in the just in-focusing state.

In view of the problem discussed above, in order to allow the detecting unit to operate with a sufficient margin, it is preferable to detect a defocusing state when an area which is ⅓ of the total area of the laser spot is irradiated on the photo sensitive regions 48-1 and 48-2. This may be mathematically expressed as a condition of Sout≧3 Sin for δ=−WD/4. A radius R2 for δ=−WD/4 can be given from equation (23) as:

$$R2 = AmWD/2(F-WD/2) \quad (28)$$

The radius ra for Sout=3 Sin can be calculated to be:

$$ra = (1+\sqrt{1+8\pi})l0/8\pi = (1+\sqrt{1+8\pi})R2/4\sqrt{2} \quad (29)$$

from $$l0 \times (l0/2 + ra) = 4\pi ra^2 \, ps$$

and $$4\pi ra^2 - l0 ra - l0^2/2 = 0$$

Substitution of equation (28) in equation (29) provides:

$$ra = \{(1+\sqrt{1+8\pi})/8\sqrt{2\pi}\} \times AmWD/(F-WD/2) \quad (30)$$

The photo sensitive regions 48-1 and 48-2 are formed in a circle having the radius ra.

The above description has been made with reference to the case wherein the objective lens 42 is drawn closer to the light reflecting layer 14 of the optical disk 2. However, it is preferable if an abnormality can also be detected when the objective lens 42 is moved away from the optical disk 2. Note that in this case the problem of abutment of the objective lens 42 against the optical disk 2 is not encountered. Therefore, an absolute reference value for detection of an abnormality is not present. It is assumed that the distance between the principal point of the objective lens 42 at the side of the optical disk 2 and the focused point or the beam waist point is represented by F. Then, the size of the photo sensitive regions 48-1 and 48-2 is set such that when the objective lens 42 is shifted from the just in-focusing state by a distance F/10, the area of the laser beam spot falling outside the regions 48-1 and 48-2 becomes three times or more of that within these regions. When δ=+F/10 is substituted in equation (23) above, we have, $$R3 = \{Am/F(1+0.2)\} \times (F/5) = Am/6F \quad (31)$$

Substitution of equation (31) in equation (29) yields:

$$ra = (1+\sqrt{1+8\pi})Am/24\sqrt{2\pi}$$

Therefore, the photo sensitive regions 48-1 and 48-2 fall within the circle having the radius ra.

From the above, we can conclude the following:

(i) An abnormality can be automatically detected when the objective lens is defocused by a great defocusing displacement. Therefore, bumping of the objective lens 42 against the optical disk 2 and any subsequent damage to the optical disk 2 can be prevented.

(ii) The objective lens 42 is shifted close to the position in the just in-focusing state before the focus servo loop is closed. This allows easy control of defocusing.

(iii) Detection of an abnormality such as a large defocusing displacement can be performed with reference to the intensity of light irradiated onto the photo detecting unit. For this reason, if the light source such as a semiconductor laser is not lit, the beam spot becomes incident on the portion of the optical disk 2 on which the light reflectng layer is not formed, or part of the optical path is shielded by dust or any other material, the objective lens 42 will not be overdriven.

(iv) In curves II and III shown in FIG. 5, no abnormality or error signal at the defocusing displacement δtf is generated by the subtractor 96. When the edge of the light shielding plate 58 coincides or is near the optical axis 60, an abnormality or error signal is generated by the subtractor 96 at the defocusing displacement δtf. However, as seen from the curve I in FIG. 6, at the defocusing displacement δft, the level of the sum signal from the adder 94 has a sufficiently low level. Therefore, distances exceeding the defocusing displacement δtf result in detection of a value outside the defocusing allowance, i.e., detection of a defocusing state. Thus, the objective lens 42 can be focused with reliability.

The above embodiment is described with reference to an optical system having a light shielding plate 58. However, the present invention is similarly applicable to an optical system having a slit or aperture in place of the light shielding plate 58. In this case, the size of the photo sensitive regions 48-1 and 48-2 is determined such that Sin ≦ Sout is satisfied for δ=WD/2, Sout ≧ 3 Sin is satisified for δ= −WD/4, and Sout ≧ Sin is satisfied for δ=F/10.

In the above embodiment, the second photo detecting unit 48 is arranged at the convergent point of the optical disk 2 on the light reflecting layer 14. However, a case will now be described wherein the second photo detecting unit 48 is arranged at a position slightly shifted from the convergent point of the optical disk 2 on the light reflecting layer 14. Equations representing the optical behavior in this case will first be described.

The overall optical system will be considered as a compound lens. In the just in-focusing state, that is, when the focal point of the objective lens 42 coincides with the light reflecting layer 14 of the optical disk 2, the distance A0 between the rear principal point of the compound lens and the focal point thereof is given from equation (14) by:

$$A0 = f^*(1 \pm m) \quad (32)$$

where m is the transverse multiplication factor and $f^*$ is the focal length of the compound lens. When the photo detecting unit is located at a position at a distance A toward the compound lens from the focal point, the distance A1 between the rear principal point of the compound lens and the photo detecting unit 48 is given by:

$$A1 = A0 - \Delta = f^*(1 \pm m) - \Delta \quad (33)$$

When equation (33) is substituted in equation (20), we have:

$$h2 = h^* - A\beta 2 = \beta 0\{+\Delta/m - (\pm m \pm \Delta/f^*)\cdot 2\delta\}$$

Substitution of equation (19) in this equation provides:

$$h2 = \{\pm\Delta/m - (\pm m + \Delta/f^*)\cdot 2\delta\}\cdot\{y/f0 + (1-a/f0)(2\delta+b)]\} \quad (34)$$

This equation (34) can be applied to a relatively wide range of optical systems for defocusing detection, and can be used as a general formula. When it is assumed that Δ=0 equation (20) is obtained.

It is assumed that the radius of the exit pupil of the objective lens 42 is represented by A, and the distance between the principal point of the objective lens 42 at the side of the optical disk and the convergent point or beam waist of the beam emerging from the objective lens 42 is represented by F. When the light shielding plate 58 is not arranged in the optical path and the distance between the optical disk 2 and the objective lens 42 is deviated by a distance δ from the position corresponding to the just in-focusing state, the beam spot on the photo detecting unit 48 becomes a circle having a radius R. The radius R is given by:

$$R = |\{\pm\Delta/m + (\pm m + \Delta/f^*)\cdot 2\delta\}\{A/(F+2\delta)\}| \quad (35)$$

which is given by substitution of a=0, f0+b=F, h3=R and y=A in equation (33) above.

The size of the photo sensitive regions of the photo detecting unit for satisfying Sin ≦ Sout for δ= −WD/2, Sout ≧ 3 Sin for δ= −WD/4, and Sout ≧ 3 Sin for δ=F/10 is determined in the same manner as described above.

For δ= −WD/2, the radius R is given from equation (35) as:

$$R1 = |\{\Delta/m + (m \pm \Delta/f^*) \times WD\}\{A/(F-WD)\}| \quad (36)$$

When equations (25) and (36) are substituted in equation (26), we have:

$$ra = R1(1+\sqrt{1+4\pi})/2\sqrt{2\pi} = \{(1+\sqrt{1+4\pi})/2\sqrt{2\pi}\} \times |\{\Delta/m + (m \pm \Delta/f^*) \times WD\}A/(F-WD)| \quad (37)$$

For δ=WD/4, a radius R2 can be given from equation (35) as:

$$R2 = |\{\Delta/m + (m \pm \Delta/f^*)(WD/2)\}\{A/(F-WD/2)\}| \quad (38)$$

The radius ra for Sout=3 Sin is given by:

$$ra = l(1+\sqrt{1+8\pi})/8\pi = R(1+\sqrt{1+8\pi})/4\sqrt{2\pi} \quad (39)$$

from $l \times (l/2+rb) = 4\pi ra^2$ and $4\pi ra - lra - l^2/2 = 0$.

Substitution of equation (39) in equation (29) provides:

$$ra = \{(1+\sqrt{1+8\pi})/8\sqrt{2\pi}\} \times |\{\Delta/m + (m \pm \Delta/f^*)\cdot \times WD/2\}\{A/(F-WD/2)\}| \quad (40)$$

When δ= +F/10 is substituted in equation (35), we have:

$$R3 = |\{\pm\Delta/m + (\pm m + \Delta/f^*) \times F/5\} \times 5A/6F| \quad (41)$$

Substitution of equation (41) in equation (29) yields:

$$ra = \{(5+5\sqrt{1+8\pi})A/24\sqrt{2\pi F}\} \times 1|\pm\Delta m + (\pm m + \Delta/f^*) \times F/5| \quad (42)$$

In the embodiments described above, a defocusing state exceeding the defocusing allowance is detected by the second photo detecting unit 48 for generating a focusing signal. However, the defocusing signal can also be detected by the first photo detecting unit 52 for generating a focusing signal. More specifically, in this case, the CPU 74 supplies an alarm signal and an OFF signal to the voice coil drive circuit 72 and the switching circuit 70, respectively, when the level of the sum signal from the adder 84 for adding the photo signals from the first photo detecting unit 52 becomes lower than a predetermined level. In the case wherein a defocusing signal is detected by the first photo detecting unit 52, the first photo detecting unit 52 need not be located in the image forming plane of the light reflecting layer 14 in the just in-focusing state but can be located at a relatively arbitrary position. For this reason, the above discussion is not applicable to the size of the photo sensitive regions 52-1 and 52-2 of the first photo detecting unit 52. However, since the projection lens 62 must effectively converge the laser beam containing information on the tracking guide and the converged laser beam must be projected onto the first photo detecting unit 52, a similar discussion can be established with reference to the size of the effective aperture of the projection lens 62. Note that the effective aperture of the projection lens 62 herein means the diameter of an effective region of the lens for converting the laser beam incident thereon and for directing the converged beam toward the photo detecting unit 52. The area of an effective region of the projection lens 62 for projecting light rays toward the photo detecting unit 52 is calculated from this aperture.

The path of light rays on the projection lens 62 is given by equation (6). When the radius A (y=A) of the exit pupil of the objective lens 42 is substituted for y of equation (6), a radius Rp of the beam in the plane including the projection lens 62 for a defocusing deviation $\delta$ is obtained as:

$$Rp = |A(1-LF(\delta))| = |A - L/(f_0 + f_0^2/2\delta)| \qquad (43)$$

As has been described above, when the objective lens 42 draws near the optical disk 2 from the position corresponding to the just in-focusing state by the distance $-WD/2$, the beam radius becomes R4 given by:

$$R4 = A|1 - L/(f_0^2 - f_0^2/WD)| = A(1 + L/(f_0 - f_0^2/WD)) \qquad (44)$$

The laser beam having this radius R4 consists of an effective component or a component which is directed toward the photo sensitive regions 52-1 and 52-2 of the first photo detecting unit 52, and a noneffective component or a component directed to a region outside the photo sensitive regions 52-1 and 52-2. The effective component of the laser beam passes through the central region of the projection lens, that is, through the effective aperture. Meanwhile, the noneffective region passes through the peripheral, noneffective region of the projection lens surrounding the effective region. Therefore, the noneffective component need not be particularly converged by the projection lens 62. In an imaginary plane including the projection lens 62, the noneffective region through which the noneffective component passes and the effective region through which the effective component passes hold a relationship substantially the same as that between the photo sensitive regions and the beam spot shown in FIGS. 11A to 11E. Therefore, by the same token, in order that the area of the noneffective region Sout is greater than that of the effective region Sin, the effective aperture which determines the effective region Sin must be smaller than a value twice that of the radius r, that is, the diameter. The radius r is defined by:

$$\pi rp^2 = (\tfrac{1}{4})\pi R4^2 \qquad (45)$$

When equation (44) is substituted in equation (45), the following equation is obtained:

$$rp = (A/\sqrt{2})\{1 + L/(f_0^2/WD - f_0)\} \qquad (46)$$

Therefore, the effective aperture of the projection lens 62 is seen to be smaller than 2rp when it is expressed in terms of rp given by equation (46). When the conditions of defocusing displacement $\delta = -WD/4$ and Sout=3 Sin are given, the following equations (47) to (49) are established and a satisfactory stability against the defocusing allowance, that is, a satisfactory margin, is obtained.

$$R5 = A\{1 + L/(2f_0^2/WD - f_0)\} \qquad (47)$$

where R5 is the radius of the noneffective region. The radius rp for Sout=3 Sin is similarly defined by the following equations (48) and is given by equation (49) below:

$$\pi rp^2 = 4\pi R5 \qquad (48)$$

Substitution of equation (47) into equation (48) provides:

$$rp = (A/2)\{1 + L/(2f_0^2/WD - f_0)\} \qquad (49)$$

When the effective aperture of the projection lens 62 is expressed in terms of rp defined by equation (49), it is preferably smaller than 2rp.

In a system for detecting a defocusing state by the first photo detecting unit 52, if the light shielding plate 58 is inserted in the optical path between the objective lens 42 and the projection lens 62, a similar consideration as that given to equations (24) to (31) with reference to FIGS. 12A to 12E is established. In other words, under the condition of Sout=Sin, equation (50) similar to equation (26) and given as below is established:

$$rp = Rp(1 + \sqrt{1+4\pi})/2\sqrt{2}\pi \qquad (50)$$

When the radius R4 under the condition of $\delta = -WD/2$ is adopted as the radius Rp, the radius Rp is given by equation (51) below:

$$rp = \{(1 + \sqrt{1+4\pi})/2\sqrt{2}\pi\} \cdot A\{(1 + L/(f_0 - f_0^2/WD))\} \qquad (51)$$

Therefore, the effective aperture of the projection lens 62 must be smaller than 2rp.

Equation (52), which is similar to equation (28) is established for the conditions $\delta = -WD/4$ and Sout=3 Sin and is given by:

$$rp = Rp(1 + \sqrt{1+8\pi})/4\sqrt{2}\pi \qquad (52)$$

When equation (47) is substituted in equation (52), the following equation (53) is obtained:

$$rp = \{(1 + \sqrt{1+8\pi})/4\sqrt{2}\pi\} \cdot A\{(1 + L/(2f_0^2/WD - f_0))\} \qquad (53)$$

From the above, it is seen that the effective aperture of the projection lens 62 must be smaller than the value twice this radius.

In the above embodiments, the laser beam is reflected by the light reflecting layer 14 of the optical disk 2 and is split into two components by the beam splitter 36 through the objective lens 42. One component is directed toward the first photo detecting unit for detecting a tracking error. The other component is directed toward the second photo detecting unit for detecting a focus state of the objective lens 42. However, the present invention is not limited to this, and can be applied to an optical system as shown in FIG. 13 or 14. Referring to FIG. 13 or 14, the laser beam from the laser 30 is colliminated into parallel light rays by the collimator lens 34, and the colliminated light rays are directed toward the beam splitter 36 through a triangular prism 110. The parallel laser beams emerging from the beam splitter 36 become incident on the objective lens 42 and are converged thereby toward the light reflecting layer 14 of the optical disk 2. The objective lens 42 is supported to be movable along its optical axis by the voice coil 44. When the objective lens 42 is located at a predetermined position, the most converged portion of the beam from the objective lens 42, that is, the beam waist is projected onto the surface of the light reflecting layer 14 so as to form a beam waist spot thereon. In this state, the objective lens 42 is in the just in-focusing state so that information can be read out or can be written.

The divergent laser beam reflected by the light reflecting layer 14 is converted into parallel light beams by the objective lens 42 in the just in-focusing state which are returned to the beam splitter 36 through the ¼ wave plate 40. When the laser beam is passed through the ¼ wave plate 40 twice in this manner, the laser beam is rotated in its polarization plane from that of the beam emerging from the beam splitter 36. The 90°-rotated laser beam is not passed through the beam splitter 36 but is reflected thereby. The laser beam reflected by the beam splitter 36 propagates such that one component therefrom is passed through a Daubee prism 102 and the other component is passed straight outside the prism 102. Thereafter, the laser beam is sequentially passed through the projection lens 62 and a cylindrical lens 104 and is irradiated onto a photo detecting unit 106. In the embodiment shown in FIG. 13, the cylindrical lens 104 is arranged such that the direction of the generator is perpendicular to the bottom of the Daubee prism 102. In the embodiment shown in FIG. 14, the cylindrical lens 104 is arranged such that the direction of the generator is parallel to the bottom of the Daubee prism 102. The photo detecting unit 106 consists of four split photo sensitive regions 106-1, 106-2, 106-3 and 106-4 arranged on the diagonals thereof. The regions 106-2 and 106-4 detect a focus state of the objective lens 42. The regions 106-1 and 106-3 detect a tracking error. Signal readout is performed by the sum of signals from the regions 106-1, 106-2, 106-3 and 106-4.

In the system having the construction as described above, 100% of the laser beams become incident without being intercepted by the light shielding plate or the like. Therefore, the light intensity contributing to detection is large, and the optical S/N ratio is improved. Thus, the frequency characteristics of the detected signals are improved, high-speed signal processing can be performed, and the photo detecting unit 106 can be rendered small in size. Since only one photo detecting unit is required, the overall system can be made small in size and low in cost.

The present invention is applicable to various optical systems. The present invention provides an optical head which allows detection of a defocus state of an objective lens with high sensitivity and can stably shift the objective lens to the position corresponding to the just in-focusing state.

What is claimed is:

1. A system for focusing a light beam on a light reflecting surface of an optical recording medium comprising:
    means for generating a light beam;
    means for transferring the light beam;
    objective lens means for converting the transferred light beam into a convergent light beam with a beam waist, projecting said convergent light beam on the light-reflecting surface, and transmitting a light beam reflected from the light-reflecting surface;
    photodetector means, having photo sensitive regions to which the reflected light beam is directed, for forming a beam spot on said photosensitive regions, and for generating photo signals, wherein a total area of said regions of said photodetector means is smaller than a portion of the beam spot which is formed outside said regions of said photodetector means when said objective lens means reaches a predetermined focusing state outside of a predetermined defocusing allowance of said objective lens means; and
    means for moving said objective lens means in reference to said photo signals.

2. A system according to claim 1, wherein said moving means moves said objective lens means along its optical axis within a predetermined working distance WD.

3. A system according to claim 2, further comprising deflecting means, arranged between said photodetector means and said objective lens means, for deflecting the reflected light beam in accordance with a distance between said objective lens means and said light reflecting surface.

4. A system according to claim 2, wherein a first defocusing state outside the defocusing allowance is defined by a position assumed by said objective lens means after moving toward said light reflecting surface by a distance WD/2 from a position corresponding to a just in-focusing state in which said beam waist is formed substantially on said light reflecting surface.

5. A system according to claim 4, wherein said photo sensitive regions are defined within a circle of an area substantially half that of a portion of the beam spot formed on said photodetector means when said objective lens means is moved toward said light reflecting surface by the distance WD/2 from the position corresponding to the just in-focusing state.

6. A system according to claim 5, wherein said photo sensitive regions are defined within a circle having a radius ra given by:

$$ra = R1(1+\sqrt{1+4\pi})/2\sqrt{2\pi}$$

where R1 is a radius of the beam spot formed on said photodetector means when said objective lens means is moved by the distance WD/2 toward said light reflecting surface from the position corresponding to the just in-focusing state.

7. A system according to claim 6, further comprising means for converging the reflected light beam.

8. A system according to claim 7, wherein said photo sensitive regions are located substantially in a plane in which an image of a portion of said light reflecting surface is formed by said objective lens means and said converging means when said objective lens means is in the just in-focusing state.

9. A system according to claim 8, wherein the radius R1 of the beam spot is given by:

$$R1 = |Am \cdot WD/(F-WD)|$$

where F is a distance between a principal point of said objective lens means and a focal point thereof, A is a radius of an exit pupil of said objective lens means, and m is a transverse manification factor of an imaging system of said photodetector.

10. A system according to claim 7, wherein said photo sensitive regions are located slightly shifted by a distance $\Delta$ from a plane in which an image of a portion of said reflecting surface is formed by said objective lens means and said converging means when said objective lens means is at the position corresponding to the just in-focusing state.

11. A system according to claim 10, wherein the radius R1 is given by:

$$R1 = |\{\Delta/m + (m \pm \Delta/f^* \times WD)\}\{A/(F-WD)\}|$$

where F is a distance between a principal point of said objective lens means and a focal point thereof, A is a radius of an exit pupil of said objective lens means, and m is a transverse magnification of an imaging system of said photodetector.

12. A system according to claim 2, wherein a predetermined defocusing state outside the defocusing allowance is defined by a position assumed by said objective lens means upon moving toward said light reflecting surface by a distance WD/4 from a position corresponding to a just in-focusing state in which said beam waist is formed substantially on said light reflecting surface.

13. A system according to claim 12, wherein said photo sensitive regions are defined within a circle of an area substantially a quarter that of a portion of the beam spot formed on said photodetector means when said objective lens means is moved toward said light reflecting surface by a distance WD/4 from the position corresponding to the just in-focusing state.

14. A system according to claim 13, wherein said photo sensitive regions are defined within a circle having a radius ra given by:

$$ra = R2(1+\sqrt{1+8\pi})/4\sqrt{2\pi}$$

where R2 is a radius of the beam spot formed on said photodetector means when said objective lens means is moved by the distance WD/4 toward said light reflecting layer surface from the position corresponding to the just in-focusing state.

15. A system according to claim 14, wherein said photo sensitive regions are located in a plane in which an image of said light reflecting surface is formed by said objective lens means and said converging means when said objective lens means is in the just in-focusing state.

16. A system according to claim 15, wherein the radius R2 of the beam spot is given by:

$$R2 = |Am \cdot WD/2(F-WD/2)|$$

where F is a distance between a principal point of said objective lens means and a focal point thereof, A is a radius of an exit pupil of said objective lens means, and m is a transverse magnification factor of an imaging system of said photodetector.

17. A system according to claim 14, wherein said photo sensitive regions are located slightly shifted by a distance $\Delta$ from a plane in which an image of a portion of said light reflecting surface is formed by said objective lens means and said converging means when said objective lens means is at the position corresponding to the just in-focusing state.

18. A system according to claim 17, wherein the radius R2 is given by:

$$R2 = |\{\Delta/m + (m \pm \Delta/f^* \times WD/2)\}\{A/(F-WD/2)\}|$$

where F is a distance between a principal point of said objective lens means and a focal point thereof, A is a radius of an exit pupil of said objective lens means, and m is a transverse magnification of an imaging system of said photodetector.

19. A system according to claim 2, wherein a second defocusing state outside the defocusing allowance is defined by a position which is assumed by said objective lens means upon moving toward the photodetector means by a distance F/10 from a position corresponding to a just infocusing state in which said beam waist is formed substantially on said light reflecting surface.

20. A system according to claim 19, wherein said photo sensitive regions of said photodetector means are defined within a circle having a radius ra given by:

$$ra = Am(1+\sqrt{1+8\pi})/24\sqrt{2\pi}$$

where A is a radius of an exit pupil of said objective lens means and m is a transverse magnification factor of an imaging system of said photodetector.

21. A system according to claim 2, further comprising projection lens means for projecting said reflected light beam onto said photodetector means.

22. A system according to claim 21, wherein said projection lens means has an effective aperture which is smaller than a region through which the light beam projected on said regions of said photodetector is passed when said objective lens means reaches a position corresponding to a predetermined defocusing state outside the defocusing allowance.

23. A system according to claim 22, wherein a first defocusing state outside the defocusing allowance is defined by a position assumed by said objective lens means after moving toward said light reflecting surface by a distance WD/2 from a position corresponding to a just in-focusing state in which said beam waist is formed substantially on said light reflecting surface.

24. A system according to claim 23, wherein said projection lens means has an effective aperture of 2rp where rp is given by:

$$rp = (A/\sqrt{2})\{1+L/(f0^2/WD-f0)\}$$

where A is a radius of an expit pupil of said objective lens means, f0 is a focal length of said projection lens means, and L is a distance between said objective lens means and said projection lens means.

25. A system according to claim 23, wherein said projection lens means has an effective aperture of 2rp where rp is given by:

$$rp = (A/\sqrt{2})\{1+L/(f0^2/WD-f0)\}$$

where A is a radius of an expit pupil of said objective lens means, f0 is a focal length of said projection lens means, and L is a distance between said objective lens means and said projection lens means.

26. A system according to claim 23, further comprising:

deflecting means, arranged between said photodetector means and said objective lens means, for deflecting the reflected light beam in accordance with a distance between said objective lens means and said light reflecting surface.

27. A system according to claim 26, wherein said projection lens means has an effective aperture of 2rp where rp is given by:

$$rp = \{(1+\sqrt{1+4\pi})/2\sqrt{2\pi}\}A\{1+L/(f0-f0^2/WD)\}$$

where A is a radius of an expit pupil of said objective lens means, f0 is a focal length of said projection lens means, and L is a distance between said objective lens means and said projection lens means.

28. A system according to claim 26, wherein said projection lens means has an effective aperture of 2rp where rp is given by:

$$rp = \{1+\sqrt{1+8\pi})/4\sqrt{2\pi}\}A\{1+L/(2f0^2/WD-f0)\}$$

where A is a radius of an expit pupil of said objective lens means, f0 is a focal length of said projection lens means and L is a distance between said objective lens means and said projection lens means.

29. A system according to claim 1, further comprising:
  means for adding the photo signals generated by said photodetector means to provide an added signal; and
  means for comparing a level of the added signal with a predetermined level, and for generating an alarm signal when the level of the added signal is smaller than said predetermined level.

30. A system according to claim 29, further comprising:
  means for processing said photo signals to generate a focus signal corresponding to a distance between the objective lens means and the light reflecting surface;
  said moving means moving the objective lens means in accordance with the focus signal; and
  means for disconnecting the processing means and the moving means when the connecting means receives the alarm signal.

* * * * *